United States Patent [19]

O'Neal, III

[11] 4,000,457
[45] Dec. 28, 1976

[54] COLD CATHODE IONIZATION GAUGE CONTROL FOR VACUUM MEASUREMENT
[75] Inventor: Charles D. O'Neal, III, Pepperell, Mass.
[73] Assignee: Varian Associates, Palo Alto, Calif.
[22] Filed: Oct. 6, 1975
[21] Appl. No.: 620,004
[52] U.S. Cl. .................................... 324/33; 323/1; 250/386; 307/235 R; 328/262
[51] Int. Cl.² ................ G01N 27/00; H01J 39/28
[58] Field of Search ............ 324/33; 323/4, 28, 42, 323/43, 1; 307/235 R, 235 N, 296; 328/228, 262; 250/387, 386

[56] References Cited
UNITED STATES PATENTS

| | | |
|---|---|---|
| 2,956,156 | 10/1960 | Crowther et al. .................. 323/28 |
| 3,379,967 | 4/1968 | Herrwerth et al. .................. 324/33 |
| 3,447,072 | 5/1969 | Sheldon .............................. 324/33 |
| 3,518,532 | 6/1970 | English .............................. 324/33 |
| 3,872,377 | 3/1975 | Kageyama et al. .................. 324/33 |

Primary Examiner—R. V. Rolinec
Assistant Examiner—Vincent J. Sunderdick
Attorney, Agent, or Firm—Stanley Z. Cole; Leon F. Herbert; Edward H. Berkowitz

[57] ABSTRACT

A cold cathode ionization gauge controller utilizing a periodically varying potential across the gauge tube at higher pressure and substantially constant potential at low pressure provides a wide-range pressure measurement capability from about $10^{-1}$ to about $10^{-7}$ torr.

11 Claims, 6 Drawing Figures

COLD CATHODE IONIZATION GAUGE CONTROL FOR VACUUM MEASUREMENT

BACKGROUND OF THE INVENTION

1. Field of the Invention

This invention relates to the art of gas pressure measurement in the pressure range of $10^{-1}$ to $10^{-7}$ torr by cold cathode ionization gauges. The invention is directed specifically to the circuit which controls such gauges and similar types of loads.

2. Description of the Prior Art

A cold cathode ionization guage includes a gauge tube and a controller circuit. One typical cold cathode ionization gauge tube consists of a central cathode wire held at a potential of the order of kilovolts with respect to a coaxially surrounding anode within a magnetic field of the order of kilogauss oriented parallel to the cathode. When a suitably intense electric field is applied across the cathode and anode, electrons are derived from the cathode by field emission. These electrons are constrained by the magnetic field to trajectories about the central cathode. By collisions of these electrons with residual gas molecules present in the volume of the gauge, positive ions and additional free electrons are generated. The additional electrons, picking up kinetic energy from the radial electric field and confined by the axially directed magnetic field, are in turn precursors of subsequent ionizing collisions. The avalanche of ionization reaches an equilibrium value limited by the numerical density of gas molecules within a time of the order of $10^{-3}$ seconds depending upon the pressure. The positive ions, which are affected only slightly by the magnetic field, are collected at the cathode and result in a net current, functionally related to the pressure, ultimately drawn from the power supply.

The conventional cold cathode gauge employs a d.c. potential across the gauge tube. The current across gauge tubes increases with increase in pressure. Thus, if the d.c. potential is high enough for gas discharge at low pressure such as $10^{-6}$ torr, the power dissipated at high pressures, such as $10^{-2}$ torr, becomes too great to be sustained without damage to the gauge tube. The present invention overcomes the problem by providing substantially constant full peak potential at the low pressure extreme and providing a lower potential (average potential) at high pressures.

A different cold cathode gauge of the prior art, U.S. Pat. No. 3,447,072 was designed to excite the gauge tube with an alternating potential. In this apparatus the gauge tube is subject to the full cycle of an a.c. waveform in contrast to the present invention wherein only that half cycle is employed which causes the ion current to be collected at the cathode, namely the negative half cycle. This gauge is further distinguished by the invariance of the waveform as contrasted with the present invention in which the shape of the waveform varies over the pressure range of the instrument.

SUMMARY OF THE INVENTION

An object of this invention is to permit a higher pressure reading capability than is possible for prior art cold cathode ionization gauges without unduly large power dissipation. This object is achieved by applying a periodically varying potential and measuring a root-mean-square current when the gauge is operating at high pressures.

Another object of this invention is to preserve the low pressure reading capability of a cold cathode ionization gauge by providing an external capacitance across the gauge tube, which external capacitance is charged to the peak potential of the periodically varying voltage. This source of relatively continuous peak voltage provides the long time high voltage required to initiate the discharge at low pressure.

The objects of the invention are achieved by supplying the gauge tube with a potential which is a unidirectional periodically varying potential at high gauge current (high pressure) and approaches or reaches a constant potential, approximating or equaling the peak periodically varying potential, at low gauge current (low pressure). The amplitude of the periodically varying potential applied across the gauge at high pressure varies from a low to a maximum value above the discharge initiation point, or "strike" voltage. The root-mean-square current drawn is attenuated relative to the direct current case of the conventional prior art through a duty cycle of less than 100%, the specific duty cycle being dependent upon the voltage waveform employed and the variation of strike potential with pressure. The duty cycle is also subject to a pressure dependence through the combination of the voltage waveform shape at any given pressure and the pressure dependence of the strike voltage. As noted below, the voltage waveform varies with the current drawn from the controller, approaching a constant value for very small current at the low pressure extreme. Finally, the pressure dependence of the discharge current determines the scale, or amplitude of the current waveform.

The limitation on gauge tube current affects the low pressure reading capability through the reduced probability for an initial ionizing event at low pressure. To compensate, the circuit incorporates a capacitance charged to peak potential of the periodically varying potential and thus maintains a potential difference across the gauge tube during the off-portion of the cycle. When the gauge tube is subject to very low pressure and therefore only slightly conducting, the potential across the gauge tube is substantially constant. The value of the capacitance is chosen to be sufficiently small as to substantially discharge within the time interval of a single period when appreciable current is drawn by the gauge tube as will occur at higher pressure. In a preferred embodiment the particular waveform employed is that of half wave rectified alternating current.

DESCRIPTION OF THE PREFERRED EMBODIMENT

Figure 1:
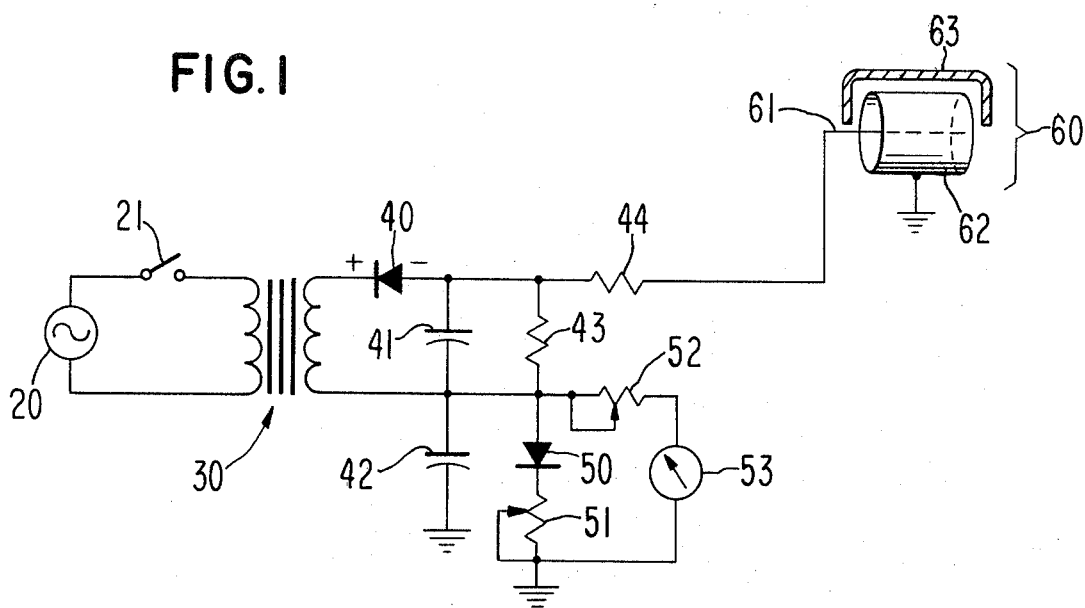
FIG. 1 is a circuit diagram of a preferred embodiment.
Figure 2A:
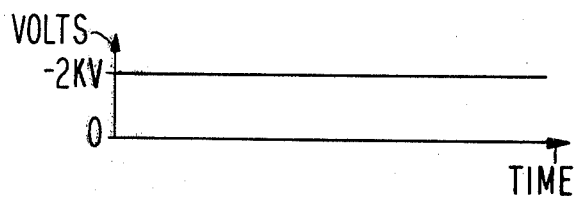
FIGS. 2 A–E illustrates the manner in which the waveform varies with the pressure in the gauge tube.
Figure 2B:
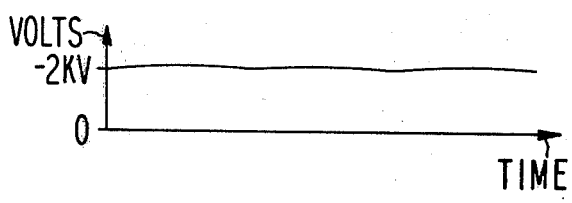
Figure 2C:
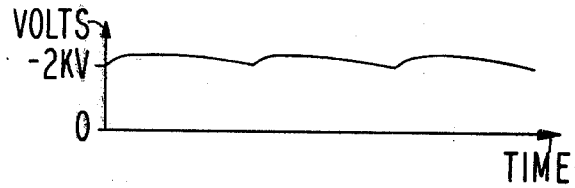
Figure 2D:
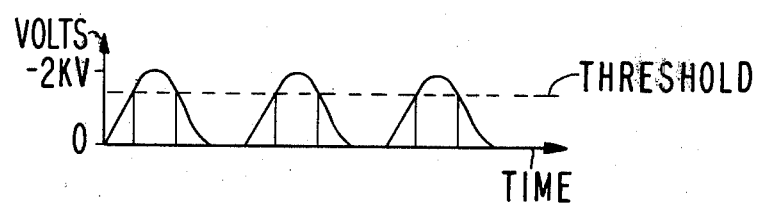
Figure 2E:
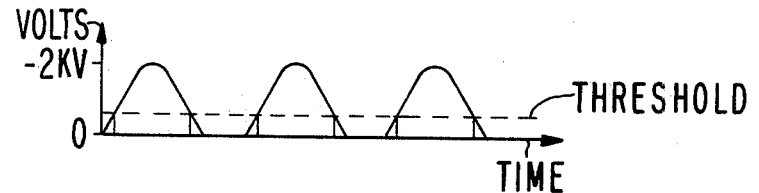

Referring to FIG. 1, there is shown a typical cold cathode ionization gauge tube, 60 comprising a central cathode 61, a coaxial anode 62 and a magnet 63, such as, for example, Varian gauge tube Model 524-2. The primary coil of a step-up voltage transformer 30 is operated from a standard alternating current source 20 through a switch 21. The transformer is selected to provide an approximately 2-milliampere short-circuit current at 1500 volts. A diode rectifier 40 having a peak inverse voltage of 8 kilovolts provides half wave rectification of the output of the transformer. The combination of 0.001 microfarad capacitor 41 with 100 megohm resistor 43 provides an essentially constant negative potential when no appreciable current is drawn, as is the condition when the gauge tube 60 is in a non-conducting state. By choice of values of capacitor 41 and resistor 43 the resulting combination is deliberately ineffective to preserve the constant potential across the gauge tube when the gauge tube is in a conducting state (at the high pressure end of its range) in order that the waveform be characterized by a peak-to-valley ratio approaching 100%, and for which the extremes bracket the range of threshold potential above which the discharge may be initiated.

Current drawn from the supply is limited by a 940K-ohm resistance 44 in series connection with the gauge tube. Resistance 44 is employed in the present system to prevent what would otherwise be substantially a short circuit when the gas in the gauge tube is substantially fully conducting at high pressures, but the value of the resistance can be low because the average applied voltage is substantially below the peak voltage. This resistance is too low to protect a conventional system at high pressure, i.e., if the peak voltage were supplied constantly at the high pressure extreme. If such a low resistance were used for a conventional d.c. system, the gauge tube would be required to be a relatively massive structure capable of dissipating power on the order of kilowatts at high pressures. The anode of the gauge tube is conveniently maintained at ground potential for safety considerations.

The positive side of the diode 40 is isolated from ground by a diode 50, as for example a 1N457A diode in series with a resistance 51 which is variable from 1K-ohm to 5K-ohm. A parallel path to ground is provided through resistance 52 which is variable from 10K-ohm to 50K-ohm in series with a current meter 53 having a 50 microampere full scape response. The diode 50 has an exponentiating transfer characteristic such that the current through the meter 53 bears a logarithmic relationship proportional to the root-mean-square current drawn by the gauge tube. Variable resistances 51 and 52 provide simple means for calibration adjustment over the useful range of the instrument. Capacitor 42, typically chosen as 50 microfarad (50 volt) aids in averaging the resultant voltage across resistance 52 and meter 53 to ground and across the diode 50 and resistance 51 to ground.

The operation of the gauge is further illustrated by FIG. 2 which provides a qualitative picture of the duty cycle variations with pressure. Frames 2 A–E of FIG. 2 represent the voltage across the gauge tube at various pressures. More specifically, FIG. 2A shows voltage at $10^{-6}$ torr, under which conditions the gauge current will be say $5\mu$ A and the current is essentially constant, i.e., peak current essentially equals average current. FIG. 2B shows the voltage across the gauge tube at $10^{-5}$ torr, only slightly departing from essentially constant voltage under which conditions the current will vary only slightly around an average current of about $50\mu$ A. At $10^{-4}$ torr FIG. 2C demonstrates the discernable effect of the periodic voltage waveform at an average gauge current of about $500\mu$ A. Over the range from $10^{-6}$ to $10^{-4}$ torr the correspondance between peak and time averaged potential is quite close and the peak and time averaged current are similarly closely approximate. In this domain the behavior of the gauge is therefore close to that of the prior art d.c. gauge. In FIG. 2D corresponding to $10^{-3}$ torr and a peak gauge current of 1mA there is a pronounced departure from the previous behavior as the capacitor fails to sustain the potential across the gauge tube over the full cycle and the average current is therefore substantially less than the peak current. Peak current is already limited at this pressure by the series resistance 44. In FIG. 2E the pressure is $10^{-2}$ torr and the peak current remains about 1mA. The waveform is effectively a half cycle sine wave. Peak current remains limited as in FIG. 2D but the time average current continues to increase because the threshold potential for the discharge occurs at a lower potential. The indicated peak voltage of 2 kilovolts, corresponding to peak potential of the circuit of FIG. 1, is a matter of design subject only to the requirement that the peak voltage substantially exceed the threshold over the operating range of pressure.

Inasmuch as variations can be made within the scope of the present invention, it is intended that the above description be read as illustrative and not in a limiting sense. This control circuit is also useful for broadening the dynamic range for current mode radiation detectors sensitive to charged particles or gamma ray or X-ray photons such as Geiger counters and ionization chambers. These detectors are functionally similar to the gauge tube discussed herein, subject to constant pressure but for which the density of ionizing events may vary. The radiation flux may then vary beyond the limits within which the detector satisfactorily responds when operated under d.c. conditions. As a further example, the control circuit of this invention can be used with any load which requires high average voltage at low current consumption and lower average voltage at higher current consumption.

What is claimed is:
1. A controller circuit for a cold cathode ionization gauge tube comprising
   means for supplying a unidirectional electric field of periodically varying amplitude within said gauge tube for high pressure conditions in said tube, the peak amplitude of said periodic electric field exceeding the threshold electric field required to initiate electrical discharge within said gauge tube at a desired low pressure extreme, and
   means for extending the time interval during which said field exceeds the discharge threshold of said gauge tube for low pressure conditions in said gauge tube.
2. The controller circuit of claim 1 wherein the source of said periodically varying electric field is a half-wave rectified alternating current power supply.
3. The controller circuit of claim 1 wherein the means for extending the time interval during which said periodically varying electric field exceeds said discharge threshold is a capacitance dischargeable through a resistance in series connection with said gauge tube.
4. The controller of claim 3 wherein the magnitude of said capacitance is such that it substantially discharges within a time interval less than one period whenever a discharge is initiated within said gauge tube at a pressure appreciably higher than said low pressure extreme.
5. The controller of claim 1 further comprising indicator means responsive to the root-means-square electrical current passing through the gauge tube.

6. The controller circuit of claim 5 wherein the indicator means comprises a meter responsive to electric current supplied to said cold cathode ionization gauge tube, and said controller circuit further comprises calibrating means by which said meter reading may be adjusted to conform to a known pressure.

7. The controller circuit of claim 6 wherein a diode characterized by exponential transfer characteristic is connected with said meter and calibration means, whereby plural decades of dynamic range of current supplied to the gauge tube may be indicated.

8. The method of measuring pressure with a cold cathode ionization gauge tube, said method comprising the steps of applying a potential across said gauge tube, said potential being periodically varying in the substantially high presssure domain of the range of said gauge tube, and altering the periodicity of said potential to a more constant value in the substantially low presure domain of the range of said gauge tube.

9. The method of claim 8 wherein said periodically varying potential comprises a periodic component and a non-periodic component and wherein the step of altering the periodicity of said potential to a more constant value comprises reducing the difference between the peak amplitude of the said periodic component and the amplitude of said non-periodic component.

10. A control circuit for supplying a variable load, comprising means for supplying a periodic electric field of relatively high peak amplitude in response to relatively high current consumption of the load and for supplying an electric field of more nearly constant amplitude in response to relatively lower current consumption of the load, whereby power consumption at a relatively high current is limited for high current loads and yet high potential is available for relatively long periods at lower current load.

11. The control circuit of claim 10 wherein said electric field of periodically varying amplitude comprises a periodic component and non-periodic component and wherein said electric field of more constant amplitude is achieved by reducing the difference in amplitude between each said component.

* * * * *